United States Patent
Hachey

(10) Patent No.: US 10,097,360 B2
(45) Date of Patent: Oct. 9, 2018

(54) AUTOMATED TEST TO TELL COMPUTERS AND HUMANS APART

(71) Applicant: Visa International Service Association, San Francisco, CA (US)

(72) Inventor: John Hachey, Elk Grove, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 224 days.

(21) Appl. No.: 14/943,932

(22) Filed: Nov. 17, 2015

(65) Prior Publication Data

US 2016/0072631 A1  Mar. 10, 2016

Related U.S. Application Data

(63) Continuation of application No. 12/562,561, filed on Sep. 18, 2009, now Pat. No. 9,225,531.

(60) Provisional application No. 61/218,287, filed on Jun. 18, 2009.

(51) Int. Cl.
  *H04L 29/06* (2006.01)
  *H04L 9/32* (2006.01)
  *G06F 21/36* (2013.01)

(52) U.S. Cl.
  CPC ............ *H04L 9/3271* (2013.01); *G06F 21/36* (2013.01); *G06F 2221/2133* (2013.01); *H04L 2209/603* (2013.01)

(58) Field of Classification Search
  CPC .................................................... H04L 9/3271
  See application file for complete search history.

(56) References Cited

U.S. PATENT DOCUMENTS

| | | | |
|---|---|---|---|
| 7,200,576 B2 | 4/2007 | Steeves et al. |
| 7,606,469 B2 | 10/2009 | Inoue et al. |
| 7,891,005 B1 | 2/2011 | Baluja et al. |
| 7,929,805 B2 | 4/2011 | Wang et al. |
| 8,036,902 B1 | 10/2011 | Strom et al. |
| 8,621,578 B1 | 12/2013 | Blomquist et al. |
| 9,225,531 B2 | 12/2015 | Hachey |
| 2004/0093527 A1 | 5/2004 | Pering et al. |
| 2007/0201745 A1 | 8/2007 | Wang et al. |
| 2008/0127302 A1 | 5/2008 | Qvarfordt et al. |

(Continued)

FOREIGN PATENT DOCUMENTS

| | | |
|---|---|---|
| WO | 2010148018 | 12/2010 |
| WO | 2010148018 | 2/2011 |

OTHER PUBLICATIONS

International Application No. PCT/US2010/038714, International Search Report and Written Opinion dated Dec. 14, 2010, 8 pages.

(Continued)

*Primary Examiner* — Simon P Kanaan
(74) *Attorney, Agent, or Firm* — Kilpatrick Townsend & Stockton LLP

(57) ABSTRACT

Techniques for verifying a user is human as opposed to a machine are provided. A series of images may be presented to the user sequentially along with a challenge question that instructs the user to select the image that is responsive to the challenge question. If the user selects the correct image, there likelihood that the user is a human as opposed to a machine is greatly increased. Techniques for varying certain parameters associated with display of images and challenge question are also provided. The variations in these parameters may further help distinguish human users from machines.

22 Claims, 6 Drawing Sheets

(56) References Cited

U.S. PATENT DOCUMENTS

| | | |
|---|---|---|
| 2008/0133321 A1 | 6/2008 | Pennock et al. |
| 2008/0133347 A1 | 6/2008 | Josifovski et al. |
| 2008/0147456 A1 | 6/2008 | Broder et al. |
| 2008/0209223 A1 | 8/2008 | Nandy et al. |
| 2008/0216163 A1 | 9/2008 | Pratte et al. |
| 2008/0244700 A1 | 10/2008 | Osborn et al. |
| 2009/0012855 A1 | 1/2009 | Jamal et al. |
| 2009/0055642 A1 | 2/2009 | Myers et al. |
| 2009/0060453 A1 | 3/2009 | Kellogg |
| 2009/0077629 A1 | 3/2009 | Douceur et al. |
| 2009/0094690 A1 | 4/2009 | Hayashi |
| 2009/0113294 A1 | 4/2009 | Sanghavi et al. |
| 2009/0138723 A1 | 5/2009 | Nyang et al. |
| 2009/0150983 A1 | 6/2009 | Saxena et al. |
| 2009/0235327 A1 | 9/2009 | Jakobsson et al. |
| 2010/0110313 A1 | 5/2010 | Souders et al. |
| 2010/0218111 A1 | 8/2010 | Mitchell et al. |
| 2010/0228804 A1 | 9/2010 | Dasgupta et al. |
| 2010/0229223 A1 | 9/2010 | Shepard et al. |
| 2010/0325706 A1 | 12/2010 | Hachey |

OTHER PUBLICATIONS

International Application No. PCT/US2010/038714, International Preliminary Report on Patentability dated Jan. 5, 2012, 7 pages.

U.S. Appl. No. 12/562,561, Advisory Action dated Jul. 28, 2014, 6 pages.

U.S. Appl. No. 12/562,561, Final Office Action dated Sep. 14, 2012, 29 pages.

U.S. Appl. No. 12/562,561, Final Office Action dated May 9, 2014, 36 pages.

U.S. Appl. No. 12/562,561, Non-Final Office Action dated Jun. 21, 2012, 19 pages.

U.S. Appl. No. 12/562,561, Non-Final Office Action dated Oct. 2, 2013, 31 pages.

U.S. Appl. No. 12/562,561, Notice of Allowance dated Aug. 17, 2015, 22 pages.

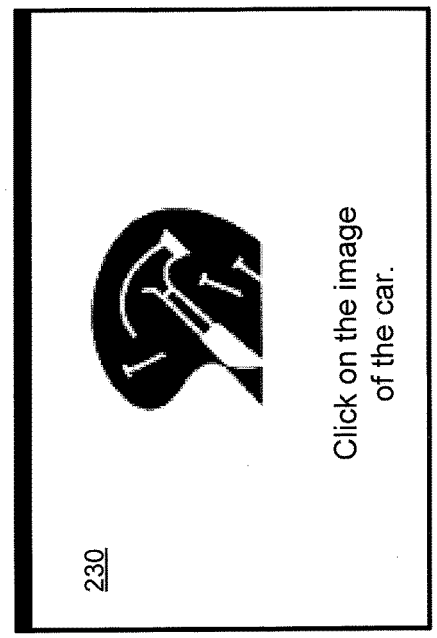
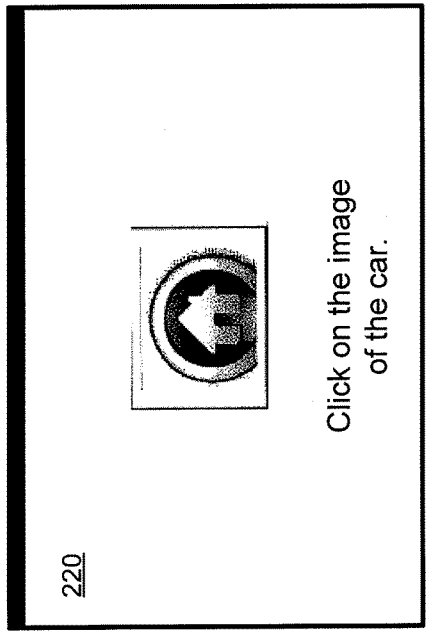
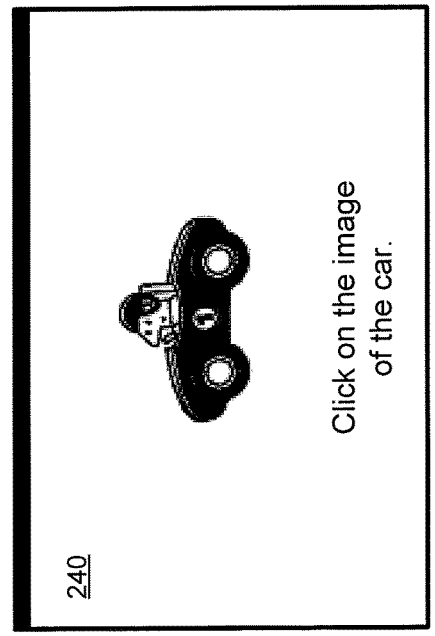
FIG. 2

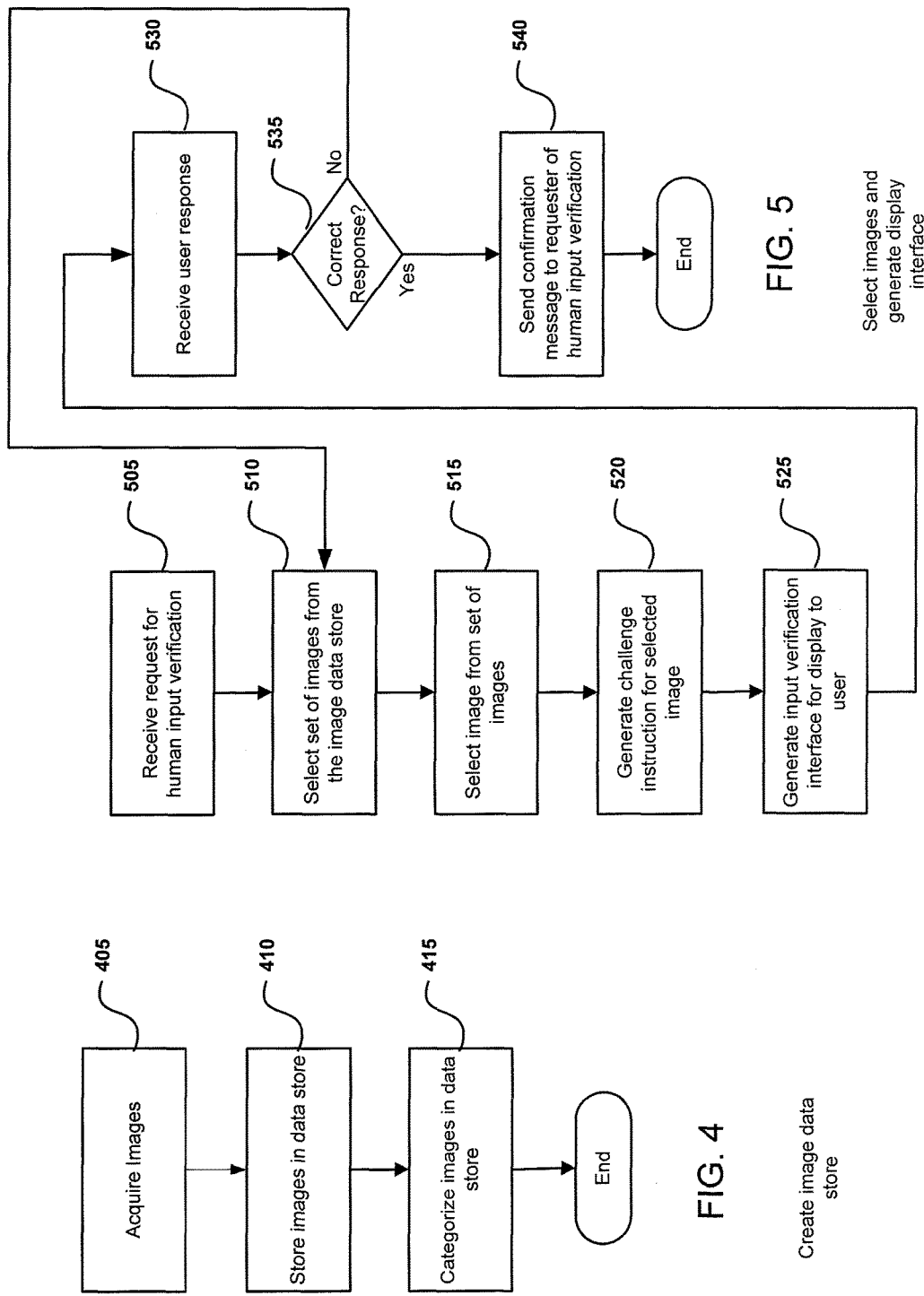

AUTOMATED TEST TO TELL COMPUTERS AND HUMANS APART

CROSS-REFERENCES TO RELATED APPLICATIONS

This application is a continuation of U.S. patent application Ser. No. 12/562,561 filed on Sep. 18, 2009 which claims priority to and is a non-provisional of U.S. provisional patent application No. 61/218,287, filed on Jun. 18,2009, the contents of which are incorporated herein by reference in their entirety for all purposes.

BACKGROUND

Challenge-response tests, such as a CAPTCHA (Completely Automated Public Turing test to tell Computers and Humans Apart) are commonly used in computing to ensure that a request to perform an action on a computer system is not generated by a computer controlled process rather than a person. For example, a CAPTCHA may be used to determine whether a user requesting to post a comment to a message board is a person and not a computer controlled process for posting spam or other nefarious activities. A CAPTCHA typically includes a challenge that would be easy for a person to solve but would be difficult or extremely time consuming for a computer to solve. FIG. 1 illustrates a common type of CAPTCHA that displays a set of distorted letters and/or numbers to the user and requires that the user type the set of letters and numbers displayed. The letters and/or numbers are often significantly distorted to thwart the use of image analysis techniques that would enable a computer system to recognize the characters and/or numbers included in the CAPTCHA.

If the set of letters and numbers typed by the user matches the set of distorted letters and numbers, the user may be permitted to complete the action. If the user fails to correctly type the letters and/or numbers displayed in the CAPTCHA, the user is not permitted to complete the action. In some instances, the letters and/or numbers are so significantly distorted that a user may have a difficult time recognizing the characters and/or numbers represented. As a result, the user may have to make numerous attempts to decipher to distorted content, which may lead to user frustration. The problem of deciphering the distorted content may be compounded for users who have impaired vision or dyslexia.

Some attempts at replacements for a CAPTCHA as described in FIG. 1 are known. For example, U.S. Patent Application Publication No. 2009/0138723 to Nyang, et al. describes a CAPTCHA based on images, as opposed to text. Multiple images, such as photographs may be combined. Such combinations can include superimposing one image on top of another. The user is then asked to identify elements contained in the combined images. The combination of multiple images purportedly makes automated image analysis difficult.

Another contemplated replacement for a CAPTCHA as depicted in FIG. 1 is described in U.S. Patent Application Publication No. 2007/0201745 to Wang, et al. which describes another image based CAPTCHA. In the system described therein, multiple images are initially distorted. These images are then combined into a single composite image, but unlike Nyang, the images are not superimposed on each other, but rather are laid out in a non-overlapping manner. The boarders of the multiple images are blurred to purportedly make image analysis difficult. A user identifies portions of the image that contain an element, and clicks on the element. The user must then annotate the element with a description of what it is.

Image based CAPTCHA tests as described in Nyang and Wang still suffer the same problems as the prior art CAPTCHA test depicted in FIG. 1. Superimposing and distorting images results in making it more difficult for a human to identify what is contained in the image. Furthermore, image analysis techniques are always improving. Superimposed images can be separated into their component parts. Blurred images can be un-blurred. Given enough time, image analysis techniques may be able to overcome any of the obfuscation methods described in Nyang and Wang.

These and other problems, are addressed by embodiments of the invention, individually and collectively.

BRIEF SUMMARY

Techniques for verifying a user is human as opposed to a machine are provided. A series of images may be presented to the user sequentially along with a challenge question that instructs the user to select the image that is responsive to the challenge question. If the user selects the correct image, the likelihood that the user is a human as opposed to a machine is greatly increased. Techniques for varying certain parameters associated with the display of images and challenge questions are also provided. The variations in these parameters may further help distinguish human users from machines.

According to one embodiment, a method is provided. The method comprising the following steps performed in response to a user request to complete an action on a computer system: selecting a set of images from an image data store; displaying each image from the set of images to the user in a sequential fashion, each image being displayed for an interval of time; presenting a challenge instruction to the user, the challenge instruction instructing the user to select one of the set of images identified in the challenge instruction; and receiving a user input indicating an image from the set of images selected by the user. The method also comprises selecting a different set of images from the data store, displaying the different set of images to the user in a sequential fashion, and presenting a new challenge instruction associated with the different set of images if the user fails to select the identified image. The method further comprises performing the action from the user request if the user selects the identified image.

Another embodiment of the invention is directed to a computer readable medium comprising code for implementing the above-described method.

These and other embodiments of the invention are described in further detail below.

BRIEF DESCRIPTION OF THE DRAWINGS

FIG. 2 shows an example of an interface for input verification system according to an embodiment.

FIG. 4 is a high level block diagram of the process for acquiring images.

FIG. 5 is a high level block diagram of the process of invoking a visual CAPTCHA.

DETAILED DESCRIPTION

Figure 1:
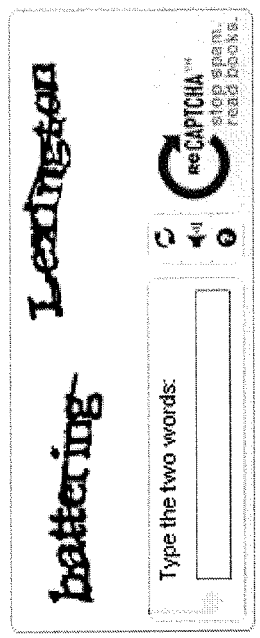
FIG. 1 shows an example of an interface of a conventional input verification system.

Techniques for alternative human input verification are provided herein that overcome the deficiencies of conventional human input verification techniques, such as the CAPTCHA techniques described above. The techniques will generally be referred to as visual CAPTCHA. The techniques disclosed herein may be incorporated into various applications requiring protection from nefarious users which can be referred to colloquially as "hackers" using "webbots" or Internet bots. Bots are software applications that run automated tasks over the Internet. Hackers may use bots for various nefarious tasks, such as sending spam via email, posting spam to message boards or blogs, and/or for distributing malicious executable content, such as viruses and worms, to compromise and take over computer systems and to steal personal information.

In response to a user request to perform an action in an electronic environment, a visual CAPTCHA interface may be displayed. For example, a web-based email system may present the alternative human input verification interface in response to a user request to create a new email account in order to prevent hackers from using bots to automatically sign up for numerous email accounts that could be used to disseminate spam and/or malicious executable content.

The visual CAPTCHA interface may generally comprise two parts. The first part is a challenge request, which may also be referred to as a challenge question. The challenge request will instruct the user to select an image containing a certain element. Generally, the element requested in the challenge request will be a broadly defined element, however the granularity of the challenge request may be modified based on the particular level of protection desired or on the level of sophistication of the intended audience. For example, a challenge request on a general purpose computing system may be as simple as "Select the image containing the picture of a Dog."

The granularity of the challenge request may be varied depending on the particular audience that is attempting to access data or service protected by a visual CAPTCHA. For example, on a web site dedicated to dog owners, the challenge request may be more specific, such as "Select the image containing the picture of a Poodle." It may be assumed that users of a web site dedicated to dog owners would be able to identify a specific breed of dog, such as a Poodle.

The second part of the visual CAPTCHA is the presentation of a series of images, one of which will match the criteria specified in the challenge request, to the user. The images may be presented sequentially, such that only one image is displayed at a time. When the image that is responsive to the challenge request appears, the user may click, or otherwise indicate selection, of that image. If the user clicks on the correct image, access to the content or services may be allowed, while an incorrect selection may deny access.

Unlike image based tests as described in Nyang and Wang, embodiments of the present disclosure advantageously do not rely on a lack of sophistication of image analysis techniques. By varying factors related to the display of images, embodiments of the present disclosure are designed to thwart image analysis techniques. Furthermore, the systems as described in Nyang and Wang are vulnerable to hybrid human/machine attacks. A human may classify images and provide the classifications to an automated system. It then becomes a simple matter of matching images. Embodiments of the present disclosure advantageously overcome image matching techniques, again by varying the factors related to the display of images. These variations will be described in further detail below. An additional advantage of the image variation techniques presented may be that the images are not obfuscated in a manner that makes it more difficult for a legitimate human user to identify the contents of the image.

FIG. 2 illustrates a block diagram of a series of sequential screen shots 210, 220, 230, and 240 representing an alternative human input verification interface according to one embodiment. In response to a user requesting to perform a particular action on a web site or other electronic environment, a set of images may be selected from a large data store of public domain images. The images may include digitized photographs, simple clip art, digitized hand drawings or paintings, and/or other image content. The images may be categorized in the data store according to what the image represents. For example, the images may be categorized into various categories such as: building, house, dog, cat, forest, lake, family, woman, or car. The categories should be descriptive enough of the images so that a user presented with the category would be able to select an image associated with the category from a set of images that includes images for various different categories.

The set of images selected from the large data store of public domain images is displayed to the user sequentially, and a challenge instruction that instructs the user to select a particular image is also displayed. A human operator will typically be able to read the challenge instruction and analyze the displayed images in fractions of a second. For example, if the challenge instruction states to select the image that contains a picture of a dog, a human operator will generally be able to identify if a dog is contained in an image almost instantaneously.

In contrast, even the most sophisticated computer programs are no match for the cognitive abilities of the human brain. Although there are computer programs available that can analyze an image, these programs are typically used to identify if an already identified feature is present in the image. For example, there are facial recognition programs that can compare a person's facial image to captured images, to determine if the person's facial image is present in the captured image. Such programs may be used for purposes of security, as in identifying a specific person from a surveillance video.

Even the most sophisticated computer programs typically require a control image, such as a person's facial image, to compare to the scene that is being presented. Computer algorithms today are generally not sophisticated enough to be given an arbitrary image, with arbitrary positioning of potentially multiple elements, and identifying the contents of the image. So, although image analysis algorithms may be able to determine if a specific, defined element, such as a person's facial image, is present in an image, the algorithms do not perform as well when given an arbitrary image, without a control image for comparison.

To further aid in thwarting the ability of an automated program to analyze an image in an attempt to respond to the challenge question, a wide variety of images, from various sources, may be stored in the image database. Acquisition of such images will be described in further detail below, but for now, it should be understood that the images may contain multiple elements, aside from the specific element referenced by the challenge question. Continuing with the example, if the challenge question requests the user to select the picture that contains a dog, an image may be presented that contains two people, in front of a house, petting a dog. A human user would identify the dog immediately, while a computer program may not even be able to recognize the elements contained in the image.

The vast variety of image types available would also be an impeding factor in automated image recognition. As mentioned above, the image database may contain any type of image, such as drawings, photographs, clipart, line drawings, etc. A human user would typically be able to identify basic elements of the presented image, regardless of the format in which the image is presented. A computer algorithm on the other hand may be optimized for a particular type of image, such as a photograph. Because the images are selected randomly, and can be of any type, it would be difficult to optimize an image recognition algorithm to identify a randomly selected element, from a randomly selected image, which may be in a randomly selected format.

To further thwart automated image analysis techniques, each image is presented for a short period of time, e.g. one or two seconds. In some embodiments, the amount of time each image is displayed is varied upon each invocation of the visual CAPTCHA. For example, the first invocation may display each image in the set of images for two seconds. Upon the next invocation, each image may only be displayed for one second.

By varying the amount of time each image is displayed for each invocation of the visual CAPTCHA, automated programs that may attempt to use image recognition algorithms to identify each image will not have a deterministic amount of time to process the image. Some image recognition algorithms may allow for optimization based on the amount of time available to process the image. The longer time available, the more accurate the analysis. However, the amount of time available must be known in advance. For example, if an algorithm is optimized to produce an analysis in two seconds, if the image is displayed for less than two seconds, an accurate analysis cannot be obtained. Furthermore, optimizing the algorithm for a shorter period of time may result in a less accurate analysis. As such, by keeping an automated program guessing as to how long each image will be displayed, it will be difficult for a malevolent actor to optimize his image analysis techniques based on a known quantity of time available to analyze an image.

In some embodiments, the random variation in the amount of time an image is displayed may not only be from one invocation of the visual CAPTCHA to the next, but may actually vary within a single invocation. For example, the first image may be displayed for 1 second, the second image for 0.5 seconds, and the third image for two seconds, and so on, for each image in the selected set. The variation in the amount of time each image of the set is displayed may be random. As explained above, by varying the amount of time an image analysis application has to analyze an image, the more difficult it is to optimize such an application. This further level of randomization makes it even more difficult for automated image recognition techniques to be effective.

A first image from the sequence is displayed in screen shot 210, a second image from the sequence is displayed in screen shot 220, a third image from the sequence is displayed in screen shot 230, and a fourth image from the sequence is displayed in screen shot 240. Only four different images are included in the example illustrated in FIG. 2, but the number of images include in the selected set of images may vary. Selecting a larger number of images may decrease the odds that a bot may randomly select the correct image from the set of images. The challenge instruction is also displayed to the user as part of the user interface. For example, the challenge instruction illustrated in FIG. 2 is "Click on the image of the car."

In some embodiments, the number of images included in the set of selected images may vary. For example, in one embodiment a set of six images may be selected, while in other embodiments the number of images selected can vary between two and twelve. Any number of selected images are contemplated. Furthermore, in one embodiment, the number of images that are selected varies upon each invocation of the visual CAPTCHA. For example, upon the first invocation, the system may select a set of six images, while on a subsequent invocation, eight images are selected.

By varying the number of images that are presented per invocation of the visual CAPTCHA, embodiments of the present invention may advantageously thwart automated systems that may attempt to use probabilistic analysis to defeat the visual CAPTCHA. For example, if an automated program is able to determine that there will always be four images in a set of selected images, the program could simply choose a defined image position, such as the third image that is displayed, and always select that image, regardless of the image contents. If the target image is randomly positioned within the set of selected images, there would be a one in four chance that the third image is the target image. By varying the number of images selected per image set, an automated program is no longer able to select a specific image position and be assured with a defined probability of selecting the correct target image.

The images may continue to cycle through the set of images and start again at the beginning of the set once the entire set has been viewed. According to some embodiments, once each of the images have been displayed, a new set of images and challenge question may be presented to the user rather than redisplaying the same set of images again. Selecting a new set of images for display to the user may also thwart the use of analysis programs analyzing images in the background while other images in the set are being displayed. A copy of an image may be captured when the image is displayed and the image analyzed in the background to identify content in the image while other images in the set are being displayed. By limiting each image to a single period of display, an automated program would only have the limited time of display to determine the content, as that image once removed from the display screen, will not be presented again.

In some embodiments, the position of each image on the screen may be random. For example, the first image may be in the bottom left corner of the screen the second image in the center of the screen, the third image in the top right of the screen, and so on. By randomly positioning the image, it is much more difficult for an image analysis program to identify the particular area of the screen that should be analyzed. The image analysis program would need to view the entire screen as a single image, in which case the clutter typically found on web pages would further frustrate the image analysis techniques. In some embodiments, additional clutter, including the elements that match the challenge question may intentionally be distributed throughout the screen to further confuse image recognition programs.

If the image recognition program does not view the entire screen as a single image, the program must then first analyze the entire display screen to determine where the images being presented are located. It is only after this initial step that image recognition can be performed. Because each image is only displayed for a short period of time, it is possible that by the time the image position is determined, the image will have been replaced with the next image in the selected set. Furthermore, the position of each individual image need not be static. In some embodiments, each image may be presented in an animated format, where the image moves about the screen. The movement may be as minor as moving the image only a few pixels in either direction, or could be as dramatic as moving the image from one side of the screen to the other. In all cases, such movement would have minimal impact on a human perceiving the image, but would dramatically decrease the effectiveness of automated programs.

Although the techniques presented above are helpful in thwarting completely automated attempts at defeating the visual CAPTCHA, ever resourceful malevolent actors may attempt alternative bypass techniques. One such technique may involve a hybrid approach, in which human operatives and automated systems operate in conjunction to defeat the visual CAPTCHA. One possible attack vector involves the use of humans to review the images presented in a visual CAPTCHA, and catalog the images based on the contents of the image. For example, a bad actor may employ a large number of employees who are located in low labor cost regions to sit at a computer and review and classify the visual CAPTCHA images as they are presented. Each image may be captured, characterized, and classified. Characterizing the image may include items such as the filename associated with the image, the binary content of the image, the file size associated with the image, or other such items. Classifying the image may consist of identifying the elements present in the image. For example, an image that contains a dog and a house can be classified as both dog and house. This information can be used later when attempting to match an image. If the image database is small and static, eventually, the employees will be able to properly capture, characterize, and classify each image in the database.

Once each image has been characterized and classified, the information can be fed to an automated system. The automated system would likely be able to parse the challenge question to determine the particular element that should be identified. For example, if the challenge question is "Select the picture containing a dog" it would be a relatively straightforward parsing process to determine that "dog" is the element of interest. The automated system would then be able to attempt to match each displayed image with the images as captured and characterized by the employees.

The process of matching an image is not the same as image analysis. Image analysis, as described above, requires large amounts of computer processing power, and may only obtain marginal results. In contrast, image matching can be as simple as a rote filename comparison of the image that is being presented with the filename of the image as had previously been characterized. Similarly, image matching may include techniques such as matching the binary contents of an image file, the size of the image file, or other such techniques.

Once an image presented by the visual CAPTCHA has been matched to a previously characterized image, and the element of interest has been determined from the challenge question, it would simply be a matter of comparing the element of interest to the classifications as previously provided by the human operators. For example, if the challenge question is "Select the image with a picture of a dog," it would be straightforward to determine the element of interest is a dog. If the image that is sent has a specific filename, such as "picture25.jpg" this filename may be matched with a previously characterized image. At that point the element of interest can be compared with the human provided classifications, and if there is a match, the image can be selected, thus allowing the visual CAPTCHA to be defeated.

Embodiments of the disclosure advantageously overcome a hybrid human/machine attack in several ways. First, to overcome the possibility of human users characterizing and classifying all of the images in the image database, a large number of constantly changing images may be used to populate the image database. This process of image acquisition will be described further below.

The hybrid attack can also be defeated by thwarting the ability of the automated system to match images. For purposes of the explanation of preventing image matching, temporarily assume the image database contains a small, finite number of images, that have all been characterized and classified by a human operator. One such technique has been previously presented in the context of thwarting image analysis, in that the image may be randomly positioned on the display screen. If the automated system can't predictably find the image, it will not be possible for the image to be matched.

Another technique that may be used in some embodiments is to randomly alter filenames of the images as they are sent to the user's computer. In some embodiments, the images may be standard graphics files, that are sent to the user's computer using a standard "image" HTML tag which contains a filename of the image. In other embodiments, the visual CAPTCHA may be implemented as a flash, AJAX, or Java applet, that will contain both the image set, as well as the computer program logic for implementing the user side executable code for implementing the visual CAPTCHA. Regardless of the particular programming technique used to implement the visual CAPTCHA, the images may be associated with a filename.

In an overly simplistic implementation of the visual CAPTCHA, the file name may simply contain the name of the element of interest. For example, image files containing a dog could contain the word "dog" in the file name. Thus an image database with ten pictures of dogs could name the files dog1.jpg, dog2.jpg, etc. However, it would be clear that such a naming convention would be trivial to decipher. The element of interest in the challenge question could be determined, and simply matched to the image filename.

A more sophisticated implementation may use image filenames that are not associated with the contents at all, but rather the association is maintained by the image database, or the input verification server. The image filename containing a dog could then be anything, such as image1847623.jpg. However, even such a file naming convention would still be subject to the problem that if the particular image with the filename image1847623.jpg has been previously characterized and classified, an image match could still be performed.

Some embodiments of the disclosure advantageously overcome this deficiency by randomly selecting a filename for each image upon each invocation of the visual CAPTCHA. The mapping of the randomly selected file name to the original filename, or even the classification of the elements contained in the image file may be maintained by the input verification server. For example, an image containing a dog element may be stored in the image database as dog1.jpg. Prior to being sent to the user's computer as part of a visual CAPTCHA, the image filename could be changed to a random name, and a mapping established at the input verification server. When the user selects an image, and sends the selection to the input verification server, the random filename may then be converted back to the original filename in order to determine if the correct image was selected. The use of a random filename would thwart the ability of an image matching program to use a filename to match images that have already been characterized and classified.

In some embodiments, to overcome image matching based on characteristics of the file, such as file size, each image may be randomly resized prior to being sent to the users computer. Typically, a resize of the image will impact the file size of the image, and thus a simple comparison of the file size would no longer be effective. In some embodiments, to overcome image matching based on the complete binary representation of the file, random modifications may be made to the image. For example, a boarder may be added to an image, the image may be converted to black and white, or a mirror image may be presented. All of these modifications would typically have no impact on the ability of a human to identify image elements, but would change the binary representation of the image file. Thus, even if a version of the image has previously been characterized by its binary content, any modifications to the image would cause a binary comparison to fail. Although this description has presented several examples of image modifications, these are not intended to be limiting. Any modification to an image that alters the binary content to thwart image matching based on the binary representation of the file has also been contemplated.

In an embodiment, each of the individual image files may not be sent to the user's computer at all. Rather, all of the images in the selected set of images may be combined into a single file for presentation to the user. For example, each image of the selected set of images may be combined into a single animated Graphics Interchange Format (GIF) file. Only a single file containing the multiple images may be sent to the user's computer, and each image in the set will be displayed as part of the GIF animation. A user may select the animated GIF when the image corresponding to the challenge question is presented. The ability to transfer multiple images combined in a single file may also be provided using other programming languages, such as Java Script, Java Applets, or Flash. These particular programming languages are only exemplary, and any other technique of combining multiple images into a single file would also be suitable.

By combining multiple images into a single file, it is not possible to match a specific image based on file characteristics. The binary content of the file would vary based on the specific images contained therein. Therefore, characterization of the file would only be useful if the exact same images are selected for presentation at the time of characterization, and at the time of execution of the visual CAPTCHA. Given the high degree of randomness in image selection, this is highly unlikely.

Although several techniques for thwarting image analysis and image matching have been described, it should be understood that these techniques are not mutually exclusive, and may be arbitrarily combined. For example, an image set of four may be randomly selected and four images, one of which matches the challenge request selected from the image database. Each of the images may then be randomly resized. A boarder may be added to two of the four images selected at random. The images may then all be combined into a single animated GIF, which will then move about the display screen. In some embodiments, the selection of techniques may itself be randomized.

Text used to generate the challenge instruction may be generated using the category associated with the selected image from the set of images. The challenge instruction may simply be a text template such as "Click on the image of the [CATEGORY]." where the string "[CATEGORY]" is replaced by the category associated with the selected image. For example, in the embodiment illustrated in FIG. 2, the picture of the car illustrated in screen shot 240 was chosen from the set of images randomly selected from the image data store, and the challenge instruction "Click on the image of the car." was generated to correspond to the selected image. A user would need to select the image of the car when the image is displayed in order for the user to successfully complete the challenge. Even if an image analysis or matching algorithm were to be applied to each image in an attempt to identify the content included therein, the techniques presented above may be effective at thwarting such algorithms.

In some embodiments, the visual CAPTCHA can easily be adapted for presentation to users that may not be native speakers of the language of implementation of the test. The previous exemplary embodiments have all been presented in English, however, a Japanese native may not be able to decipher the challenge question. Using the localization features offered in most computer environments, the specific locale in which the user is located can be identified. The challenge question can then be presented in a language appropriate to the user. By selecting categories that are broad, such as dog, house, or car, disparities in language can be easily avoided.

Prior art CAPTCHAs, such as the one depicted in FIG. 1, may be biased toward users of the Roman alphabet. A user whose primary language is not based on the Roman alphabet may have difficulty identifying the characters, even before the characters are distorted. However, if asked in his primary language to identify the picture of a dog, such a user would typically have no difficulty in identifying the picture that contains a dog.

The set of images selected for display to the user may include images that are each associated with different categories of images in the image data store. By selecting images from different categories, the likelihood that a user may perceive the two or more of the selected images may be related to the challenge instruction may be reduced.

If the user clicks on an image from the set of images, a true/false value may be provided to the input verification server. A "true" value is provided to the server if the user selects the correct image from the set of images, and a "false" value is provided to the server if the user clicks on an incorrect image from the set of images. The correct image is the image from the set of selected image that matches the challenge instructions. For example, in the embodiment illustrated in FIG. 2, the correct image is the image of the car that appears fourth in the sequence of four images presented to the user. If the user clicks on the image of the car displayed in screen shot 240, a "true" value is provided to the input verification server and the user may be permitted to complete the requested action. If the user selects any of the other images in the sequence displayed in screen shots 210, 220, and 230, a "false" value is provided to the input verification server, which results in the input verification server providing a new set of images and challenge instruction to the user.

An automated program that is attempting to defeat the visual CAPTCHA may try to discover the value that is transmitted to the input verification server that designates a "true" response. For example, an automated system may repeatedly attempt to access a system that is protected by a visual CAPTCHA. The automated system may monitor the responses that are sent to the input verification server upon a random selection of an image in response to the challenge request. With enough random attempts, the automated system will eventually correctly select the image that corresponds to the challenge request. In the alternative, a human operator may be used to select the correct image, so that the value of a "true" response may be determined. Once the "true" value has been compromised, an automated system may simply send the "true" value, effectively bypassing the visual CAPTCHA.

Embodiments of the present disclosure advantageously overcome the problem of an intercepted "true" value by using a variable value to indicate a correct response. In one embodiment, the selection of an image simply provides an indication to the verification server of which image was selected. The actual determination of if the correct image was selected will be made by the verification server itself. Thus, intercepting the value that is sent to the verification server is of no use in determining the "true" value.

In an alternate embodiment, the "true" value may be encrypted, with the encryption based upon parameters including the current challenge request, the current set of images selected for presentation to the user, the number of images in the set, the variable time frames for display of each image, and the variable size of each image. The "true" value will thus be entirely dependent on the parameters of an individual invocation of the visual CAPTCHA, and will not be reusable from one invocation to the next.

Figure 3:
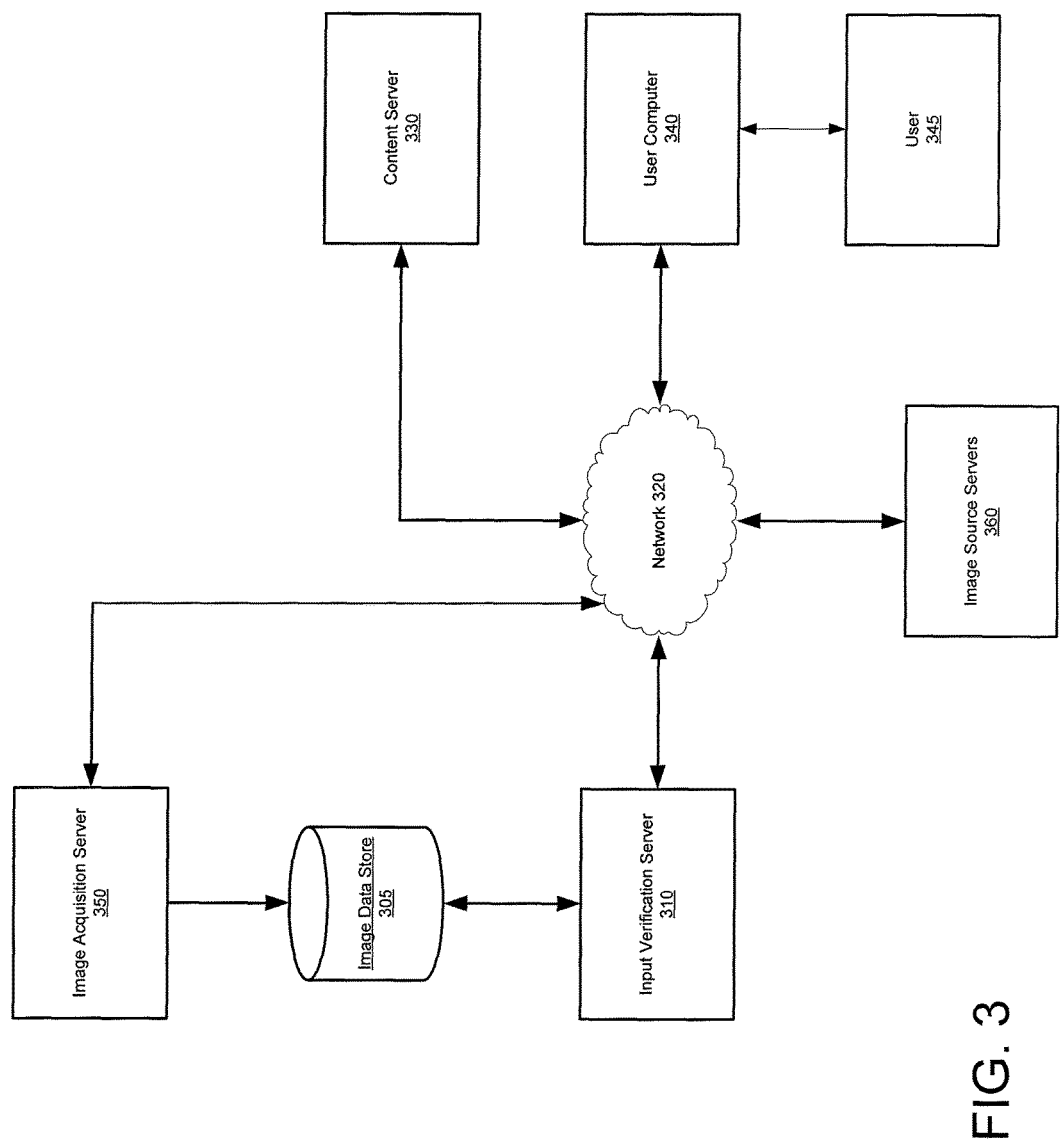
FIG. 3 is a high level block diagram of an input verification system according to an embodiment.

FIG. 3 is a high level block diagram of an input verification system according to an embodiment. The input verification system includes input verification server 310. Input verification server 310 may embody a tangible computer readable medium. The tangible computer readable medium may contain computer instructions that cause input verification server 310 to respond to a request to validate a user 345 to determine if the user is a human or a computer. The instructions may cause server 310 to select a set of images from an image data store 305. The server 310 may also generate a challenge instruction instructing the user 345 to select from the set of images an image identified in the challenge instruction. The server 310 may also generate a user interface, such as a web page, that may be sent to the user 345 through the user's computer 340. The web page generated by the server 310 may be displayed on the user's computer 340.

The input verification server 310 may receive an input from the user 345 through the user computer 340 indicating an image selected by the user from the set of images. If the user 345 selected the image identified in the challenge instruction while the image is being displayed, the server 310 may generate a response to the request to validate the user 345. The response can indicate that the user 345 has successfully responded to the challenge instruction, and can be confirmed as a human.

The input verification system may include an image data store 305. Image data store 305 stores a large number of public domain images that have been categorized according to the content represented in the image. Image Acquisition Server 350 may be used to gather and categorize the large number of public domain images from Image Source Servers 360. Input verification server 310 may generate a visual CAPTCHA interface, such as that illustrated in FIG. 2, that presents a challenge-response test to a user 345 through the user's computer 340. The challenge-response test presents a random selection of images from image data store 305 to the user. Input verification server 310 also identifies one image from the set of selected images and generates a challenge instruction based on the category associated with the identified image. Input verification server 305 may also implement any of the techniques described above to thwart automated analysis or matching of the selected images.

The random selection of images and the challenge instruction are presented to the user 345 through the user's computer 340. In some embodiments the random selection of images are presented to the user 345 through a web browser operated by the user 345 on the user's computer 340. The random selection of images are displayed sequentially to the user 340 for a short period of time, e.g. one or two seconds, and would give a user viewing the image enough time to identify the image, but short enough to prevent an image analysis algorithm from having enough time to analyze the image. If the user selects the correct image, e.g. the image associated with the challenge instruction, the user is able to able to perform the requested action, such as post a message to a message board, create a new email account, etc. If the user selects an incorrect image from the set of images, a new set of images may be selected and a new challenge instruction generated and presented to the user.

In some embodiments, user computer 340 may embody a tangible computer readable medium. The tangible computer readable medium may contain computer instructions to that cause the user computer 340 to receive a challenge request that instructs the user to select an image responsive to the challenge request. The computer instructions may cause the user computer 340 to display a user interface, such as a web page generated by the input verification server 310, on the user computer 340. The user interface may be a set of sequentially generated images. The computer instructions may cause the user computer 340 to receive a user 345 selection of one image of the set of images. If the selected image is responsive to the challenge request, the user may be granted access to a resource on content server 330.

Content server 330 provides electronic content to one or more users 340. For example, content server 330 may provide an email service, blogs, photo sharing, and/or other electronic content to users. Content provider 330 may communicate with input verification server 310 via network 322 to request that input verification server 310 provide a visual CAPTCHA interface for authenticating a user of client device. If the user correctly responds to the challenge-response test present presented in the visual CAPTCHA interface, the user may be granted access to perform the requested action on the content server 330. Input verification server 310 may redirect the user to content specified by content server 330 in the event that the user correctly responds to the challenge-response test. For example, if the user requested access to create a new user account on an ecommerce site and the user correctly responded to the challenge-response test, the user may be directed to a user profile creation page provided by content server 330. Otherwise, if the user does not correctly respond to the challenge-response test, the input verification server 310 may select another set of images and generate an new challenge instruction for display to the user.

Image acquisition server 350 may acquire, categorize, and store images from a variety of image source servers 360. For example, image source server 360 may be an image database that contains a variety of categorized public domain images. One exemplary image source server 360 may be the images search feature of Google.™ Image acquisition server 350 may be programmed to periodically query image source servers 360 for categorized images. For example, a query on the word "car" in Google's™ image search facility was performed on or about the filing date of the present application, and returned 285 million images. Image acquisition server 350 may retrieve those images and store the images in image data store 305, categorized by the term that was used to query the image source servers 360.

Querying image source servers 360 to acquire new images may be done periodically, such that new images can be stored. In some embodiments, new images may be acquired on an hourly, daily, weekly, or monthly basis. In some embodiments, as part of the process of storing new images or as a stand alone process, image acquisition server 350 may also periodically purge image data store 305 of older images. The process of periodically obtaining new images and purging old images advantageously makes it more difficult for a malevolent actor to initiate a hybrid attack, wherein humans are used to categorize images. Because of the vast number of images available, and the constant replacement of the images, it would be difficult, if not impossible, to characterize and classify the set of images that are currently stored. Even if an image is characterized, the characterization is only of limited use, as the image will eventually be purged.

In some embodiments, a human operator may review the images retrieved by image acquisition server 350 to remove potentially offensive, illegal, or overly complex images prior to storage in image data store 305. Embodiments that make use of a human reviewer may avoid situations in which queries to the image source servers 360 return offensive images, or those that may be under the protection of copyright. Furthermore, a human reviewer may be able to remove images that are overly complex. For example, if a search is performed using the keyword dog, some images may be returned that contain a dog, but would be difficult to identify. An image of a park is likely to contain a dog, but would also likely contain people, buildings, cars, bicycles, and other elements. A human operator would be able to remove such overly complicated images, in order to focus on those where the element of interest is clearly presented.

FIG. 4 is a high level block diagram of the process for acquiring images. The process of acquiring images for use in a visual CAPTCHA may begin at step 405, wherein images are retrieved. Images can come from any available source, such as public domain image databases like those offered by major search portals. The images may be acquired in an autonomous manner by querying the image databases using keywords that may also be used as categories for storing the images in the database. For example, an image query using the keyword dog may be used to retrieve images that will be categorized in the image database as images of dogs. In some embodiments, the images are not retrieved automatically, but rather are provided by a system administrator. The system administrator may use any available image, or in fact may create their own images. Regardless of how the images are acquired, the images should be capable of being categorized by rudimentary keywords.

At step 410, the retrieved images are stored in the image data store. The image data store may be a database, such as a relational database, or may simply be a file structure on a volatile or non volatile storage medium. The particular form of the image data store is not important so long as the images are made available to the input verification system. In some embodiments, the images retrieved in step 405 are stored in the image data store categorized by the search terms that were used to retrieve the images.

At step 415, the retrieved images can be categorized in the data store, if the images have not already been categorized. In some embodiments, at step 415, a human user may review images that have been retrieved and stored in the image data store. The human user may eliminate images that are unclear, ambiguous, offensive, illegal, overly complex, or inappropriate for use in a visual CAPTCHA for any other reason. Given the vast amount of available images, eliminating some of the images may not dramatically impact the available total number of images. At step 415, the images may be further categorized to reflect the keywords used to retrieve the images.

FIG. 5 is a high level block diagram of the process of invoking a visual CAPTCHA. The process may begin at step 505 with the receipt of a request for input verification. As explained above, such a request may come from any number of sources that require verification that an actual human user, as opposed to an automated program, is attempting to access resources controlled by the source of the request.

The process may continue to step 510 where a set of images is selected from the data store. As described above, the number of images in the set of images may be a random quantity, and that number may vary upon each invocation of the visual CAPTCHA. Once the set of images is selected, a single image from the set may be selected at step 515. The selected single image is the image that will constitute a correct reply to the challenge request. At step 520, a challenge instruction is generated, based on the selected single image. In one embodiment, the challenge request will be based on the category of the selected image. For example, if the selected image is categorized as a "car" the challenge request may be "select the image of a car." The challenge request may be translated into an appropriate language if the locale of the user's computer indicates that English is not the primary language.

At step 525, an input verification interface may be generated for display to the user. It is during step 525 that any of the image randomization techniques that have been described above may be implemented. For example, filenames of the images may be randomized, the size and position of the images randomized, the amount of time each image is displayed may be randomized, or any other technique to make automated image analysis or matching more difficult may be implemented. The input verification interface will present the images to the user sequentially as well as presenting the challenge request to the user.

At step 530, a response from the user is received. The response may indicate which image was chosen by the user in response to the challenge question. In some embodiments, this response will simply indicate which image was chosen. At step 535, the response provided by the user is compared with the selected image to determine if the user has selected the image corresponding to the challenge request. In some embodiments, the response will be an encrypted true/false response to indicate if the user has correctly selected the proper image. In other embodiments, the response will only indicate which image was selected, and the selection will be compared to the selected image to determine if the correct image was selected.

If the correct image was not selected at step 535, the process returns to step 510, wherein the steps will be repeated. If the correct image is selected at step 535, the process continues on to step 540, wherein an indication of successful input verification is provided to the source of the request received in step 505. At this point, the source of the request will be ensured that an actual human user is attempting access, and can provide that user with whatever level of access is appropriate.

Figure 6:
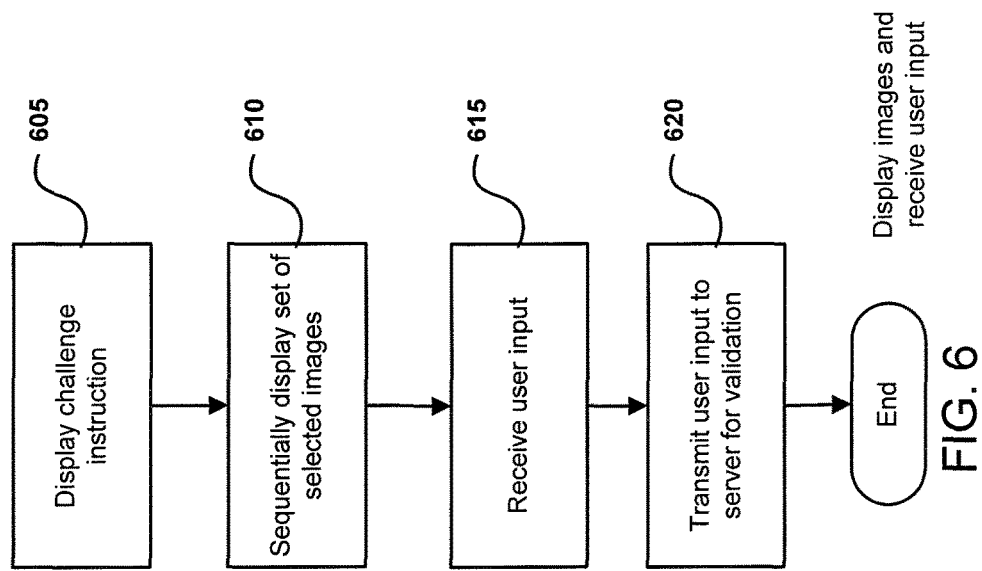
FIG. 6 is a high level block diagram of the process of responding to a visual CAPTCHA.

FIG. 6 is a high level block diagram of the process of responding to a visual CAPTCHA. The process begins at step 605 with the challenge instruction being displayed to the user. As explained above, the challenge instruction will typically instruct the user to select the image that correctly satisfies the challenge question. At step 610, a series of images are displayed to the user. The user is unaware of how many images are in the series, how long each will be displayed, or the specific format of the images. The user may view the images, and when the image that is responsive to the challenge instruction is displayed, the user may click on it.

At step 615, the image selected by the user is received. In some embodiments, the user input may simply indicate which image in the series of images was selected. In alternate embodiments, the user input will be processed to determine if the correct image was selected, and if so, an encrypted value indicating the correct image was chosen may be generated. At step 620, the user input is sent to the input verification server for validation. At this point, if the user input is successfully verified, the user will be allowed to access whatever resource was originally requested. If the input cannot be validated, the process may begin again at step 605.

Figure 7:
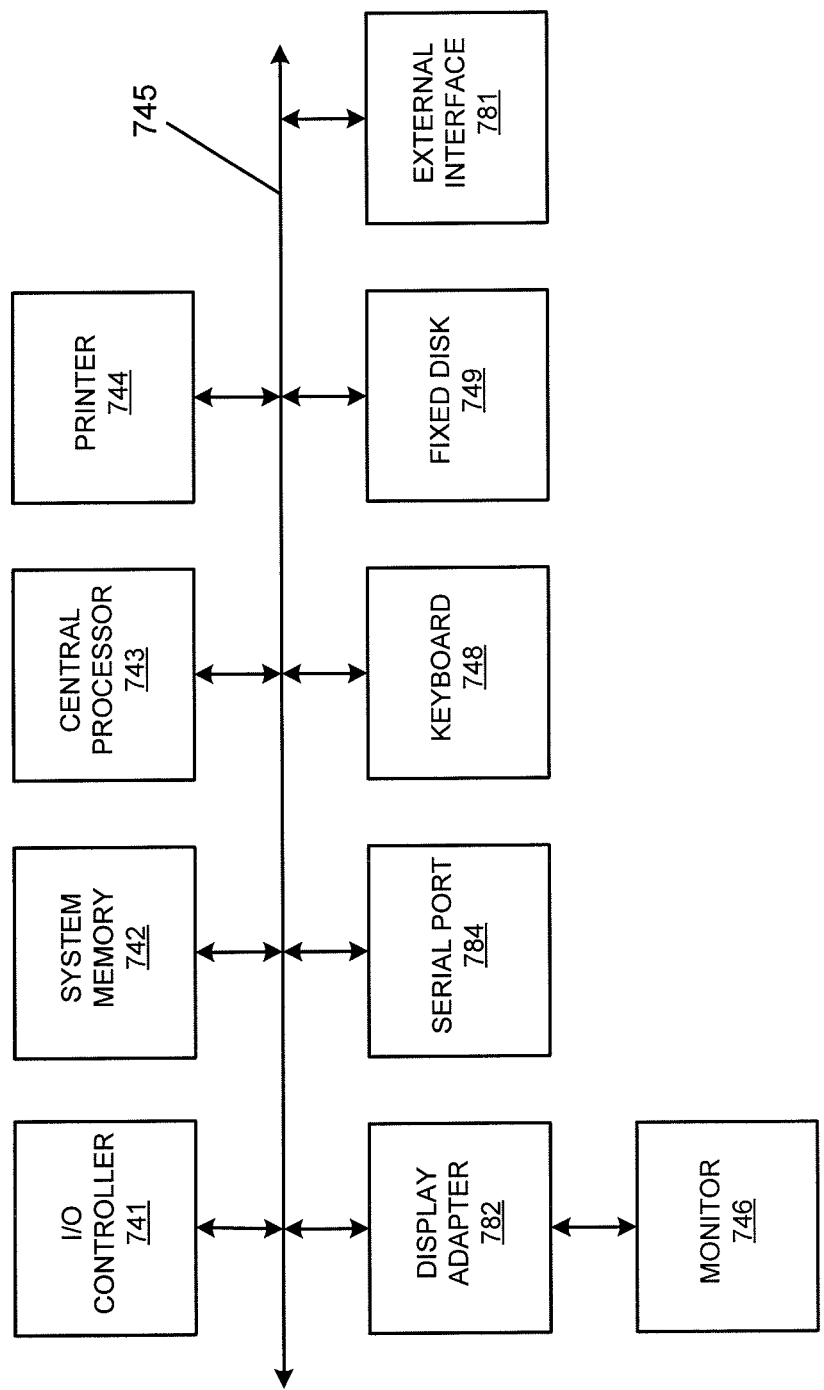
FIG. 7 is a high level block diagram of a computer system that may be used to implement an input verification system according to an embodiment.

FIG. 7 is a high level block diagram of a computer system that may be used to implement any of the entities or components (e.g., the client device 340, the content server 330, the input verification server 310, image acquisition server 320, image data store 305, image source server 360, etc.) described above may include one or more of the subsystems or components shown in FIG. 7, which is a block diagram of a computer apparatus. The subsystems shown in FIG. 7 are interconnected via a system bus 775. Additional subsystems such as a printer 744, keyboard 748, fixed disk 749, monitor 746, which is coupled to display adapter 782, and others are shown. Peripherals and input/output (I/O) devices, which couple to I/O controller 741, can be connected to the computer system by any number of means known in the art, such as serial port 784. For example, serial port 784 or external interface 781 can be used to connect the computer apparatus to a wide area network such as the Internet, a mouse input device, or a scanner. The interconnection via system bus allows the central processor 743 to communicate with each subsystem and to control the execution of instructions from system memory 742 or the fixed disk 749, as well as the exchange of information between subsystems. The system memory 742 and/or the fixed disk 749 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
   receiving a request to validate a user to determine if the user is a machine or a human;
   randomly selecting a set of images, wherein each image is categorized into a different category according to content of the image;
   randomly selecting, by a computer, an image among the set of images;
   determining, by the computer, the category associated with the randomly selected image among the set of images;
   generating, by the computer, a challenge instruction instructing the user to select an image from the set of images corresponding to the determined category;
   randomly determining, by the computer, an amount of time for the set of images;
   providing for display, via a user interface, of the challenge instruction and the set of images for the randomly determined amount of time to the user without providing a control image for comparison;
   providing for receipt, via the user interface, of a user input indicating an image selected by the user among the set of images; and
   when the image selected by the user is associated with the category determined by the computer, generating a response to the request to validate the user, the response indicating that the user has successfully responded to the challenge instruction.

2. The method of claim 1, wherein the category associated with an image is descriptive of the content of the image.

3. The method of claim 1, wherein the content of the image corresponding to the determined category includes at least one element in addition to an element identified by the determined category.

4. The method of claim 1, wherein the selected set of images are combined into a single animated image prior to display to the user.

5. The method of claim 1, wherein each image from the set of images is displayed sequentially to the user one at a time.

6. The method of claim 5, wherein each image from the set of images is displayed for a randomly selected amount of time such that a first image is displayed for a first amount of time and a second image is displayed for a second amount of time that is different from the first amount of time.

7. The method of claim 1, further comprising:
   when the image selected by the user is associated with the category identified in the challenge instruction, granting the user access to a resource.

8. The method of claim 7, wherein the resource is one of e-mail, accessing a web page, or posting a comment on a website.

9. The method of claim 1, wherein a number of images in the set of images is randomly selected.

10. The method of claim 1, wherein the displaying the challenge instruction and the set of images further comprises:
randomly selecting a position of each image on the user interface.

11. The method of claim 1, wherein the providing for display of the challenge instruction and the set of images further comprises:
providing for dynamic display of the set of images such that the displayed set of images move about the user interface.

12. The method of claim 1, further comprising:
modifying a binary representation of the set of images prior to displaying the set of images via the user interface.

13. A computer comprising a processor; and a non-transitory computer readable medium coupled to the processor, and storing executable program code, which when executed by the processor, causes the processor to:
receive a request to validate a user to determine if the user is a machine or a human;
randomly select a set of images, wherein each image is categorized into a different category according to content of the image;
randomly selecting an image among the set of images;
determining the category associated with the randomly selected image among the set of images;
determine the category associated with one of the set of images;
generate a challenge instruction instructing the user to select an image from the set of images corresponding to the determined category;
randomly determine an amount of time for the set of images;
provide for display, via a user interface, of the challenge instruction and the set of images for the randomly determined amount of time to the user without providing a control image for comparison;
provide for receipt, via the user interface, of a user input indicating an image selected by the user among the set of images; and
when the image selected by the user is associated with the determined category, generate a response to the request to validate the user, the response indicating that the user has successfully responded to the challenge instruction.

14. The computer of claim 13, wherein the selected set of images are combined into a single animated image prior to display to the user.

15. The computer of claim 13, wherein each image from the set of images is displayed for a randomly selected amount of time such that a first image is displayed for a first amount of time and a second image is displayed for a second amount of time that is different from the first amount of time.

16. The computer of claim 13, wherein a number of images in the set of images is randomly selected.

17. The computer of claim 13, wherein the displaying the challenge instruction and the set of images further comprises:
randomly selecting a position of each image on the user interface.

18. The computer of claim 13, wherein the providing for the display of the challenge instruction and the set of images further comprises:
providing for dynamic display of the set of images such that the displayed set of images move about the user interface.

19. A method comprising:
acquiring a plurality of images from a plurality of image sources;
assigning a category to each one of the plurality of images based on content of each image;
storing the plurality of images along with associated categories in a data store;
randomly selecting a set of images among the plurality of images;
randomly selecting, by a computer, an image among the set of images;
determining, by the computer, the category associated with the randomly selected image among the set of images;
generating, by the computer, a challenge instruction for selecting an image from the set of images corresponding to the determined category;
randomly determining, by the computer, an amount of time for the set of images;
providing for display, via a user interface, of the challenge instruction and the set of images for the randomly determined amount of time without providing a control image for comparison;
providing for receipt, via the user interface, of a user input indicating an image selected by a user among the set of images; and
when the image selected by the user is associated with the category determined by the computer, determining that the user has successfully responded to the challenge instruction.

20. The method of claim 19, further comprising:
continuously updating the plurality of images stored in the data store by purging old images and acquiring new images.

21. The method of claim 1, wherein a first image in the set of images is in an image format different than a second image in the set of images.

22. The method of claim 1, wherein the set of images are randomly selected from a database storing the set of images, wherein a first image in the set of images is stored at the database using a unique filename, wherein the method further comprises, prior to providing for display the set of images:
randomly selecting, by the computer, a filename for the first image;
assigning the randomly selected filename to the first image;
storing a mapping between the randomly selected filename and the unique filename; and
providing for display, via the user interface, of the first image along with the randomly selected filename for the first image to the user.

* * * * *